(12) United States Patent
Schoenherr

(10) Patent No.: US 6,694,715 B2
(45) Date of Patent: Feb. 24, 2004

(54) INVERTER SHIELD FOR A WINDROW MERGER

(75) Inventor: Terrance L. Schoenherr, Stratford, WI (US)

(73) Assignee: H&S Manufacturing Co., Inc., Marshfield, WI (US)

( * ) Notice: Subject to any disclaimer, the term of this patent is extended or adjusted under 35 U.S.C. 154(b) by 0 days.

(21) Appl. No.: 10/054,598

(22) Filed: Jan. 22, 2002

(65) Prior Publication Data

US 2003/0136097 A1 Jul. 24, 2003

(51) Int. Cl.[7] .......................... A01D 78/00; A01D 43/00
(52) U.S. Cl. ............................ 56/192; 56/365
(58) Field of Search .................. 56/192, 378, 365, 56/366, 367, 370, 372, 375, 376, DIG. 21

(56) References Cited

U.S. PATENT DOCUMENTS

| | | | |
|---|---|---|---|
| 3,702,052 A | * 11/1972 | Klassen | 56/370 |
| 4,471,605 A | 9/1984 | Ender, Sr. | 56/372 |
| 4,738,092 A | 4/1988 | Jennings | 56/372 |
| 4,748,803 A | 6/1988 | MacMaster et al. | 56/372 |
| 4,793,125 A | 12/1988 | Ehrhart et al. | 56/16.1 |
| 4,793,129 A | 12/1988 | Ehrhart et al. | 56/370 |
| 4,809,490 A | 3/1989 | Swanson | 56/370 |
| D306,737 S | * 3/1990 | VanGinhoven et al. | D15/27 |
| 5,175,987 A | * 1/1993 | Underhill et al. | 56/372 |
| 5,231,826 A | 8/1993 | Jennings | 56/11.4 |
| 5,301,496 A | 4/1994 | Sudbrack et al. | 56/366 |
| 5,596,868 A | 1/1997 | Gerbrandt | 56/365 |
| 5,904,035 A | 5/1999 | Bleacher | 56/367 |
| 5,974,774 A | 11/1999 | Peachey | 56/365 |
| 6,125,622 A | * 10/2000 | Brackebusch | 56/367 |
| 6,354,429 B2 | 3/2002 | Kuhlmann et al. | 198/510.1 |

* cited by examiner

*Primary Examiner*—Robert E. Pezzuto
(74) *Attorney, Agent, or Firm*—Patterson, Thuente, Skaar & Christensen, P.A.

(57) ABSTRACT

A windrow merger machine, having a pickup conveyor system, which elevates a windrow of crop material from ground level to a transverse conveyor assembly which displaces the windrow of crop material laterally to a discharge end includes a non-adjustable inverter shield system, attachable to the discharge end of the transverse conveyor assembly, the inverter shield system directing the crop material in a forward direction and causing the discharged crop material to invert prior to striking the ground, the inverter shield system having a frame fixedly attachable to the merger machine, a shield removably coupled to the frame, and a single point attachment being attachable to the window merger. A method of inverting crop material and an inverter shield system are further included.

28 Claims, 5 Drawing Sheets

INVERTER SHIELD FOR A WINDROW MERGER

TECHNICAL FIELD

The present invention relates to an apparatus for the handling of windrows of crop material. More particularly, the present invention relates to a device which inverts windrows of crop material upon discharge from a windrow merger.

BACKGROUND OF THE INVENTION

Many times the harvest of feed and grain products occurs during less than ideal weather conditions. When the crop is too moist it must be left in the field for drying. Typically, the product is cut, gathered and left in long parallel windrows in the field for drying. Windrows, if left untouched in the field too long can yellow the field underneath, stunting future growth in that area and attracting bug and worm infestation. Furthermore, the exposed areas of the windrow material may bleach and wilt due to exposure before the underside is able to dry. In short, the longer the crop remains untouched in the field, the greater the risk of crop and field damage. The windrows are eventually picked up so that the product can be placed in storage or further processed.

In order to minimize the number of windrows that must be picked up it makes economic sense to merge one or more windrow into a single windrow. Accordingly, there is a need in the industry for a windrow merger that is capable of efficiently picking up a windrow of crop material in a field and moving the product comprising the windrow in a transverse direction to be merged with another windrow. Furthermore, there is a need in the industry to accelerate the drying process where possible. Windrows of crop material will dry quicker if the windrows are inverted so that the underside of the crop dries. There is also a need in the industry to protect the quality of the harvest. Accordingly, inverting the crop material in the windrows lessens sun damage and shortens the time that the crop must remain in the field to attain a suitable moisture content. The optimal situation is to combine these two steps in one device. The device must have the ability to pickup the crop material in an efficient manner, displace the crop material laterally in the field so as to combine one or more windrows and invert the crop when conditions warrant.

SUMMARY OF THE INVENTION

The windrow merger inverter shield of the present invention substantially meets the aforementioned needs of the industry. The inverter shield is an improvement to a windrow merger. The attached inverter shield is solidly mounted to the frame of the windrow merger. Irregularities in the surface of the field will not affect the positioning of the inverter shield. Further, the inverter shield is of a compact design so as to minimally increase the width of the windrow merger when in the transportation mode between fields. The inverter shield is easily fixedly mounted by a single point mount adjacent to the discharge end of the transverse conveyor so as to direct the crop into a new windrow, parallel to the pickup windrow with the bottom moist side of the windrow now exposed to the sun and air. Further, the inverter shield is capable of performing the inversion of a windrow without danger of clogging in that the inversion occurs as a result of the shape of the shield which simply utilizes gravity and the transverse velocity of the crop as imparted by the conveyor to rotate the crop as it falls off the end of the conveyor.

The present invention is a windrow merger machine, said machine having a pickup conveyor system, which elevates a windrow of crop material from ground level to a transverse conveyor assembly which displaces the windrow of crop material laterally to a discharge end includes a non-adjustable inverter shield system, attachable to the discharge end of the transverse conveyor assembly, the inverter shield system directing the crop material in a forward direction and causing the discharged crop material to invert prior to striking the ground, the inverter shield system having a frame fixedly attachable to the merger machine, a shield removably coupled to the frame, and a single point attachment being attachable to the windrow merger. The present invention is further a method of inverting crop material and an inverter shield system.

DETAILED DESCRIPTION OF THE DRAWINGS

Figure 1:
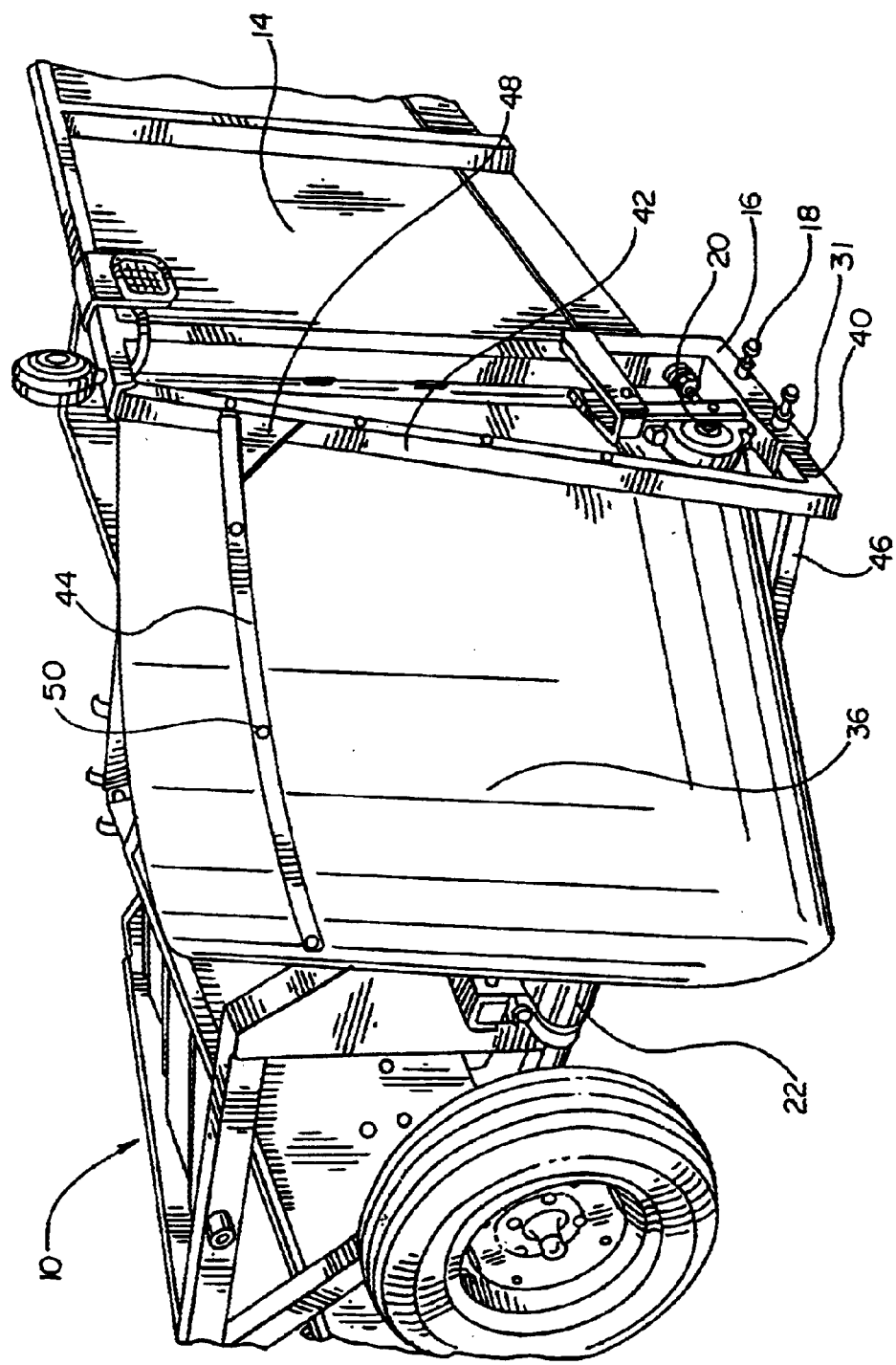
FIG. 1 is a rear side elevational view of the inverted shield as mounted on a windrow merger.
Figure 2:
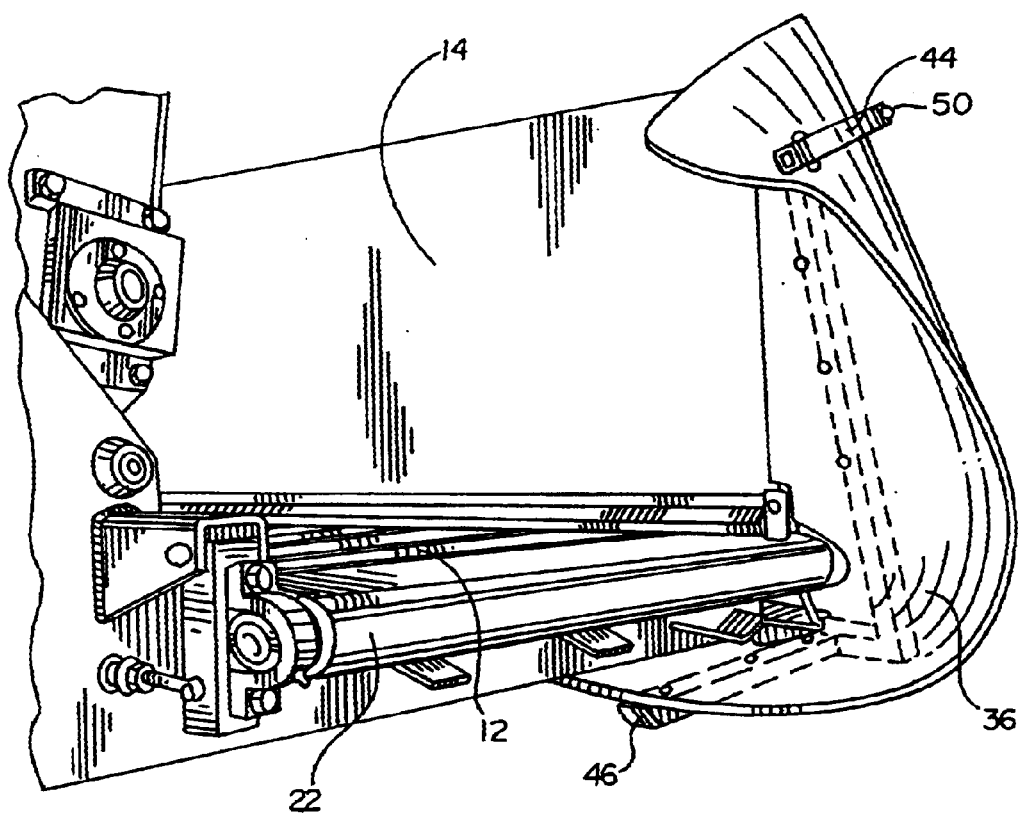
FIG. 2 is a forward side view of the inverted shield as mounted on the windrow merger.
Figure 3:
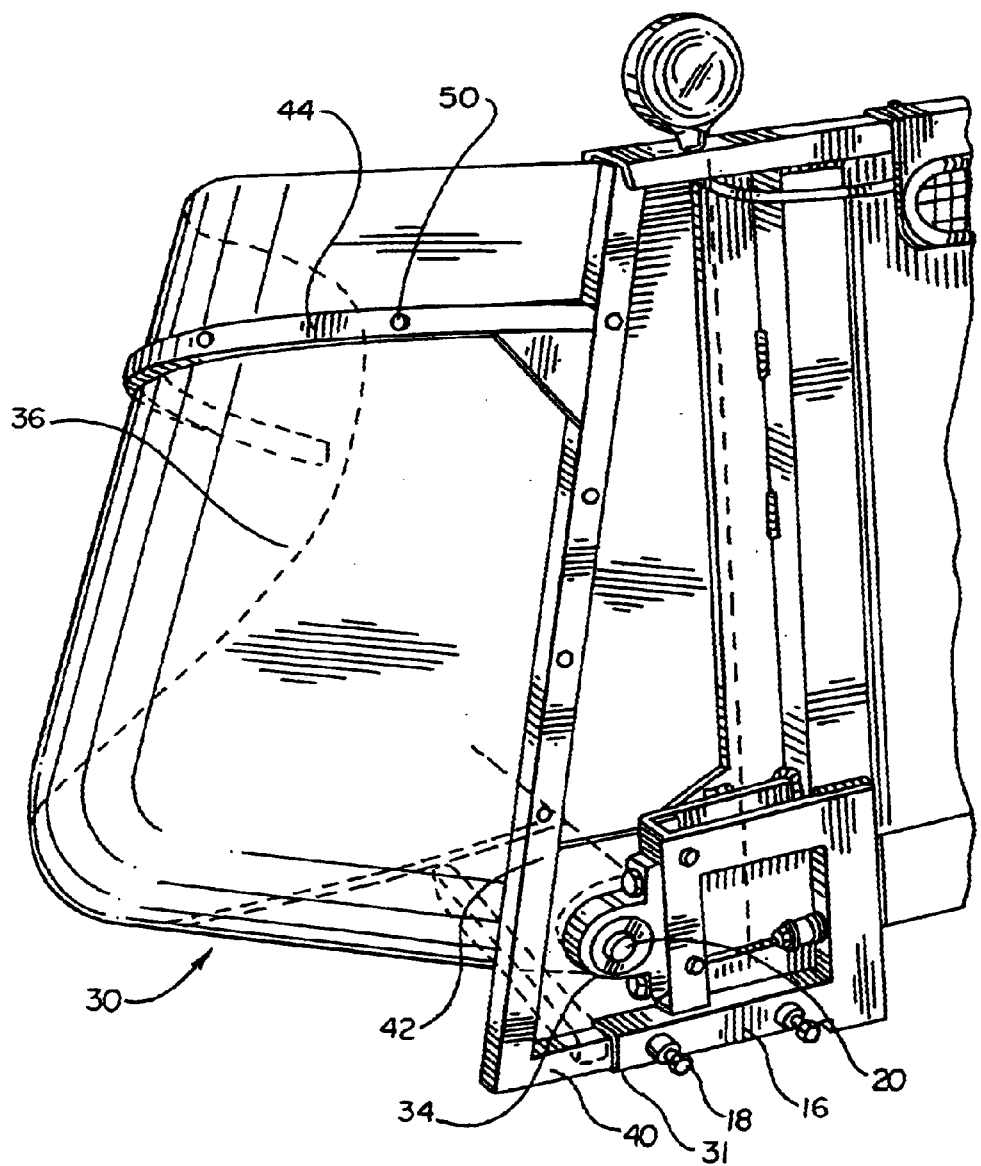
FIG. 3 is a rear side elevational view of the inverter shield as mounted on the windrow merger with a focus on the mounting frame.

The improved windrow merger of the present invention is shown generally at 10 in FIGS. 1–3. The windrow merger 10 is a towable farm implement which can be coupled to a tractor or similar device (not shown). The windrow merger 10 picks up the windrow crop material off the ground and transfers the material to the rear of the windrow merger 10 by way of a series of conveyors (not shown) where it is deposited on the transverse conveyor assembly 12. An upright wall 14 extends laterally along the rear of the transverse conveyor assembly 12 to keep the windrow material from passing over the rear of the windrow merger 10. The transverse conveyor assembly 12 laterally displaces the crop material before depositing it back in the field, forming a new windrow generally parallel to the original pickup windrow.

The present invention is an inverter shield system, shown generally at 30, which is disposed generally at the outboard discharge end of the transverse conveyor assembly 12. Instead of depositing the crop material directly in the field at the end of the transverse conveyor assembly 12 in its original orientation, the inverter shield system 30 rotates the windrow crop material 180 degrees along the vertical axis as it exits the windrow merger 10.

The inverter shield system 30 is comprised of three major components: a frame 32, conveyor bearing guard 34, and the shield 36.

Figure 4:
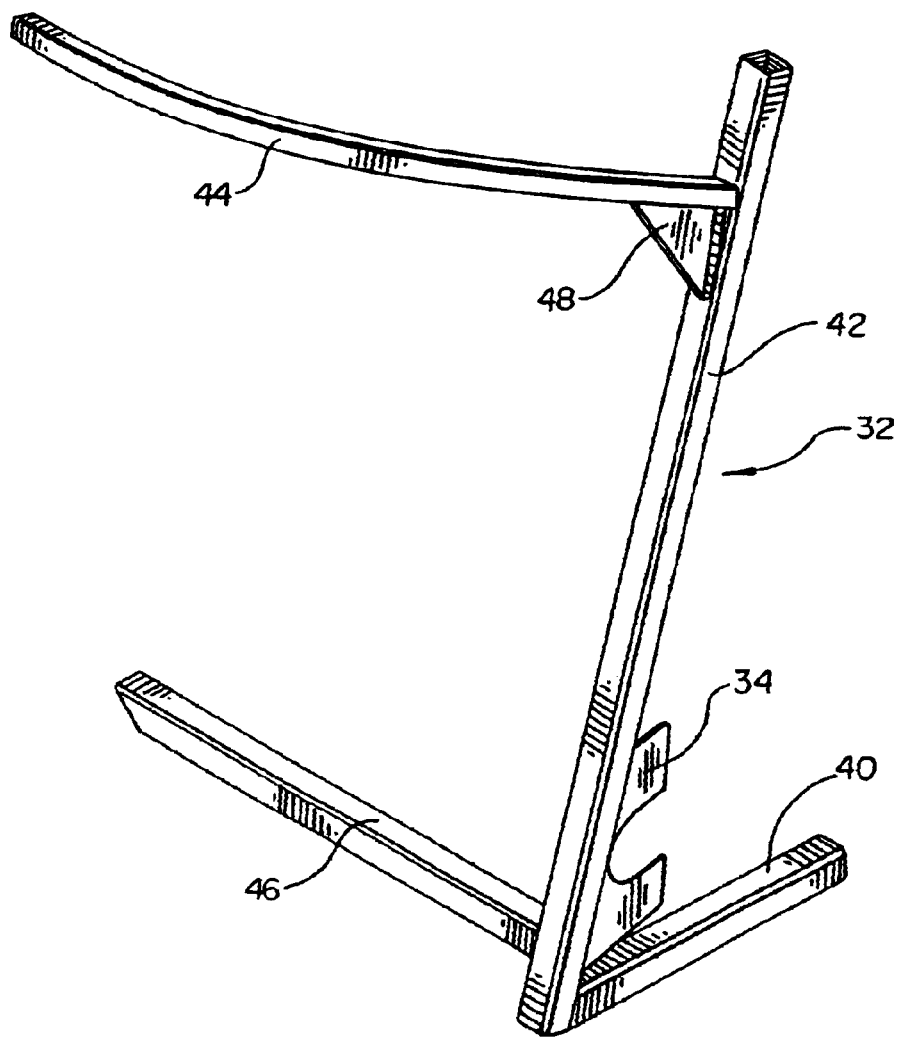
FIG. 4 is a rear side perspective view of the inverter shield frame.
Figure 5:
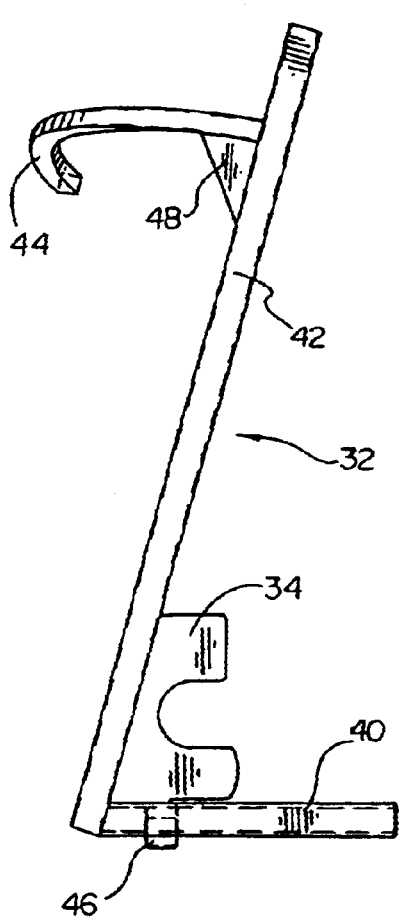
FIG. 5 is a rear view of the inverter shield frame with certain frame components shown in phantom.
Figure 6:
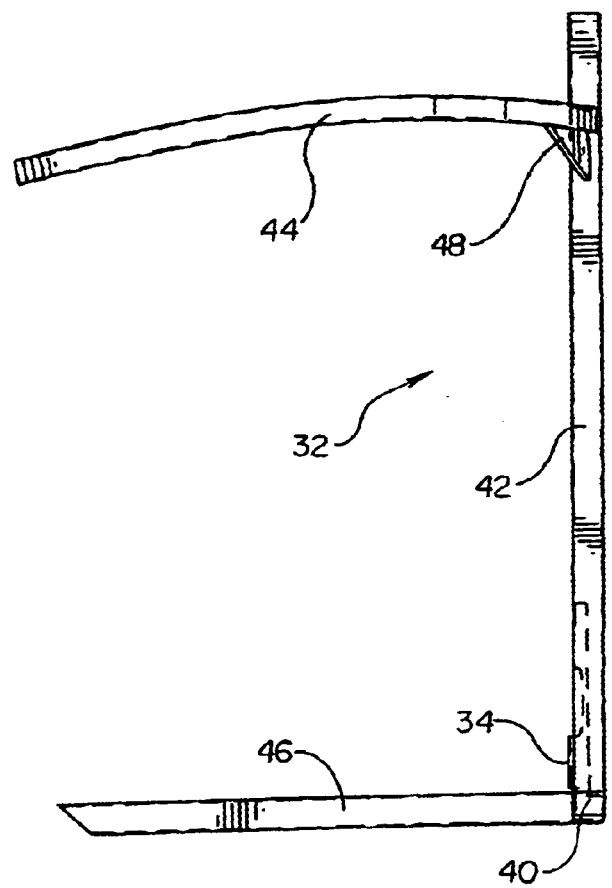
FIG. 6 is a side perspective view of the inverted shield frame.
Figure 7:
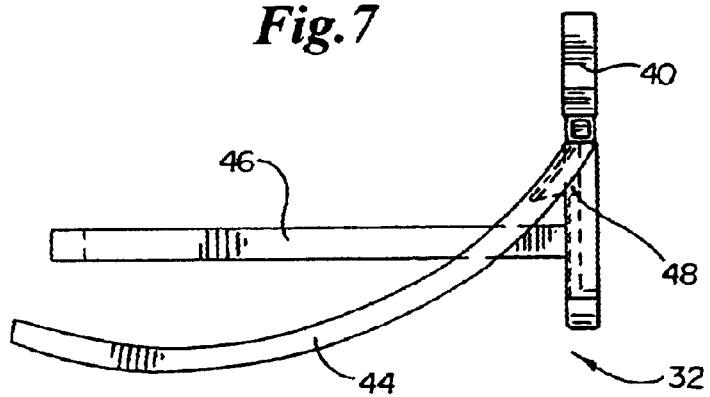
FIG. 7 is a top perspective view of the inverted shield frame.

The frame 32 is the first major component of the inverter shield system 30. Referring to FIG. 4, the frame 32 of the inverter shield system 30 is formed by four square metal tubes: the mounting tube 40, the vertical shield support tube 42, the upper shield support tube 44, and the lower shield support tube 46. The mounting tube 40, comprising the single point attachment 31, is welded to the lower end of the vertical shield support tube 42, with the resulting internal angle being slightly less than perpendicular (See FIG. 5). The lower shield support 46 is connected to the mounting tube 40 near the junction of the mounting tube 40 and the vertical shield support 42 and runs perpendicular to the mounting tube 40. The final frame member, the upper shield support 44 has a bow-like configuration with one end welded near the top of the outer face of the vertical shield support 42. The upper shield support 44 arcs from the point of attachment so as to be nearly parallel to the lower shield support 46 (See FIG. 6) and the transverse conveyor discharge roller 22. However, to shape the shield 36 correctly so that the windrow material rotates, the outboard end of the upper shield support 44 is generally lower than the inboard end which connects to the vertical shield support 42. A metal gusset 48 supports the joint of the vertical shield support tube 42 and the upper shield support 44 (see FIGS. 4–7). Accommodating varying sizes of windrows requires several different sizes of inverter shields 30 of the present invention as each inverter shield 30 has a fixed configuration. For simplicity and cost effectiveness, the various components of the frame 32 are fixed and non-adjustable and are readily replaceable.

Referring to FIGS. 1–3, the inverter shield system 30 is mounted in a fixed position to the windrow merger 10 by way a single point of attachment 31. An open ended square receptor tube 16 positioned on the back of the lower outboard corner of the rear upright wall 14 of the transverse conveyor assembly 12 to receive the single point attachment 31. The open end of the receptor tube 16 is disposed directly below the bearing assembly 20 for the transverse conveyor discharge roller 22 and the receptor tube 16 extends inboard running parallel to and along the upright wall 14. The receptor tube 16 is closely dimensioned to accept the attachment 31 of the inverter shield frame 32, which is also constructed of tubular metal. The attachment 31 of the frame 32 is inserted into the receptor tube 16 and locked into a fixed position on the windrow merger 10 by way of the receiver bolts 18.

As depicted in FIG. 3, the shield 36 forms a semi-tube. The bottom of the shield 36, rests on the lower shield support tube 46 and is positioned a few inches below the transverse conveyor discharge roller 22. The upper end of the shield 36 is shaped by the upper shield support tube 44. Note that the lower leading edge of the shield 36 bows out laterally farther from the transverse conveyor discharge roller 22 than the top leading edge so as to twist the windrow product coming off the transverse conveyor assembly 12. The shield 36 only directly blocks about half of the product passing over the transverse discharge conveyor roller 22 but because the windrow material forms a generally homogeneous mass, the entire windrow is inverted as the rear section of the windrow is redirected by the shield 36 to roll over the front section of the windrow.

The shield 36 is preferably formed of a resilient piece of plastic material that is bent to conform to the shape of the frame 32 and affixed to frame 32 by bolting thereto with bolts 50. In this manner, the shield 36 may be readily and inexpensively replaced when worn by the passage of crop material.

The third major component of the inverter shield system 30 is the conveyor bearing guard 34 which is a metal plate welded to the intersection of the vertical shield support 42 and the mounting tube 40. The conveyor bearing guard 34 is constructed to add stability to the frame 32 and shield the bearing assembly 20. The conveyor bearing guard 34 is shaped with a semi-circular cut out corresponding to the semi-circular bearing assembly 20 so as to accommodate disposing the conveyor bearing guard 34 immediate the bearing assembly 20. Note that the bottom edge of the conveyor guard 34 is also notched so as to fit above the receptor tube 16 (see FIGS. 2, 4).

In operation, crop is picked up by the windrow merger 10 as the windrow merger 10 advances in a forward direction through the field. The crop is transported laterally on the transverse conveyor assembly 12 while the windrow merger 10 continues to advance through the field. The inverter shield system 30 is forward directed. Laterally moving crop is received by the inverter shield 30, turned 90° in the direction of windrow merger 10 advance and discharges the crop. The advancing motion of the windrow merger 10 causes the crop to tuck under as the crop is discharged a known distance above the ground and the windrow falls substantially inverted to the ground. The forward, advancing motion of the windrow merger 10 in combination with this forward directed discharge from the inverter shield 30 results in the crop being inverted prior to being deposited on the ground.

It will be obvious to those skilled in the art that other embodiments in addition to the ones described herein are indicated to be within the scope and breadth of the present application. Accordingly, the applicant intends to be limited only by the claims appended hereto.

What is claimed is:

1. A windrow merger machine, said machine having a pickup conveyor system, which elevates a windrow of crop material from ground level while the merger travels along a path of travel and transfers said crop material to a transverse conveyor assembly which displaces the windrow of crop material in a direction lateral to the path of travel to a discharge end, including:

a inverter shield system, selectively attachable to the discharge end of the transverse conveyor assembly, the inverter shield system directing the crop material in a forward direction relative to said path of travel and causing the discharged crop material to invert prior to striking the ground, the inverter shield system having a frame independent of and selectively fixedly attachable to the merger machine, a shield removably coupled to the frame, and said frame including a single point attachment selectively removably attachable to the windrow merger whereby said inverter shield system can be easily attached to or removed from said windrow merger machine.

2. The windrow merger of claim 1, including a bearing guard affixed to the frame.

3. The windrow merger of claim 1 wherein the frame is comprised of an upper shield support, lower shield support, a vertical shield support and a mounting support.

4. The windrow merger of claim 3 wherein said upper shield support forms a guide, the guide for directing the crop material from motion in a generally lateral direction to motion in a generally forward direction.

5. The windrow merger of claim 3 wherein said lower shield support is situated directly below the discharge end of the transverse conveyor and supports the crop material during the directional change imparted to the crop material.

6. The windrow merger of claim 3 wherein said vertical shield support carries the upper and lower shield supports while providing vertical stability to the shield.

7. The windrow merger of claim 3 wherein said mounting support is affixable by bolts to the windrow merger in a fixed disposition, adjacent to the discharge end of the transverse conveyor assembly.

8. The windrow merger of claim 1 wherein said frame is constructed of metal tubing.

9. The windrow merger of claim 1 wherein said shield is made of a pliable, durable plastic polyethylene.

10. The windrow merger of claim 9 wherein said shield is readily replaceable.

11. The windrow merger of claim 9 wherein said shield is bolted to the upper shield support, vertical shield support and lower shield support.

12. The windrow merger of claim 2 wherein the conveyor bearing guard is a metal plate shaped so as to fit around a bearing housing of the discharge conveyor of the transverse conveyor assembly.

13. An inverter shield system for inverting a windrow of crop material and for use with a windrow merger having a pickup conveyor system, which elevates a windrow of crop material from ground level while the merger travels along a path of travel and transfers said crop material to a transverse conveyor assembly which displaces the windrow of crop material in direction transverse to said path of travel to a discharge end, comprising:

an inverter shield selectively attachable to the discharge end of the merger transverse conveyor assembly, said inverter shield having a metal frame independent of and selectively attachable to said windrow merger, said frame supporting a semi-tubular shield, said frame including a single point attachment selectively, removably couplable to the merger whereby said inverter shield can be easily attached to or removed from said windrow merger.

14. The inverter shield system of claim 13 including a bearing guard mounted to the frame.

15. The inverter shield system of claim 13 wherein the metal frame is comprised of an upper shield support, lower shield support, a vertical shield support and a mounting support.

16. The inverter shield system of claim 15 wherein said upper shield support forms a guide, the guide for redirecting the crop material motion such that the crop material is discharged from the inverter shield to fall substantially inverted to ground.

17. The inverter shield system of claim 15 wherein said lower shield support is disposable directly below the discharge end of the merger transverse conveyor and supports the crop material during the directional change imparted by the inverter shield.

18. The inverter shield system of claim 15 wherein said vertical shield support includes the upper and lower shield supports for providing vertical stability to the shield.

19. The inverter shield system of claim 15 wherein said mounting support is affixable by bolts in a fixed disposition, adjacent to the discharge of the transverse conveyor assembly.

20. The inverter shield system of claim 13 wherein said frame is constructed of metal tubing.

21. The inverter shield system of claim 13 wherein said shield is made of a pliable, resilient plastic.

22. The inverter shield system of claim 21 wherein said shield is readily replaceable.

23. The inverter shield system of claim 21 wherein said shield is bolted to the upper shield support, vertical shield support and lower shield support.

24. The inverter shield system of claim 13 wherein the conveyor bearing guard is a metal plate shaped to fit around a bearing housing.

25. Method of inverting a windrow of crop material comprising:

moving a windrow merger machine in a forward direction to continually pick up a windrow of crop material;

translating the crop material in a direction lateral to the forward direction of movement;

receiving the laterally translating crop material;

altering the direction of motion to a forward direction by directing the windrow of crop material against a semi-tubular shield; and discharging the forward moving windrow of crop material a known distance above the ground, the forward directed discharge acting in cooperation with forward directed motion to cause the crop material to invert in a fall to ground.

26. The method of claim 25 including fixedly coupling an inverter shield system to a windrow merger at a single point.

27. The method of claim 25 including shielding a bearing.

28. The method of claim 25 including forming a shield in a semi-tubular disposition.

* * * * *